Jan. 13, 1953     G. ROBERTS, JR     2,625,470
METHOD FOR PRODUCING REDUCING GAS MIXTURES
Filed Aug. 8, 1946     2 SHEETS—SHEET 1

Inventor:—
George Roberts, Jr.
By Everett A. Johnson
Attorney

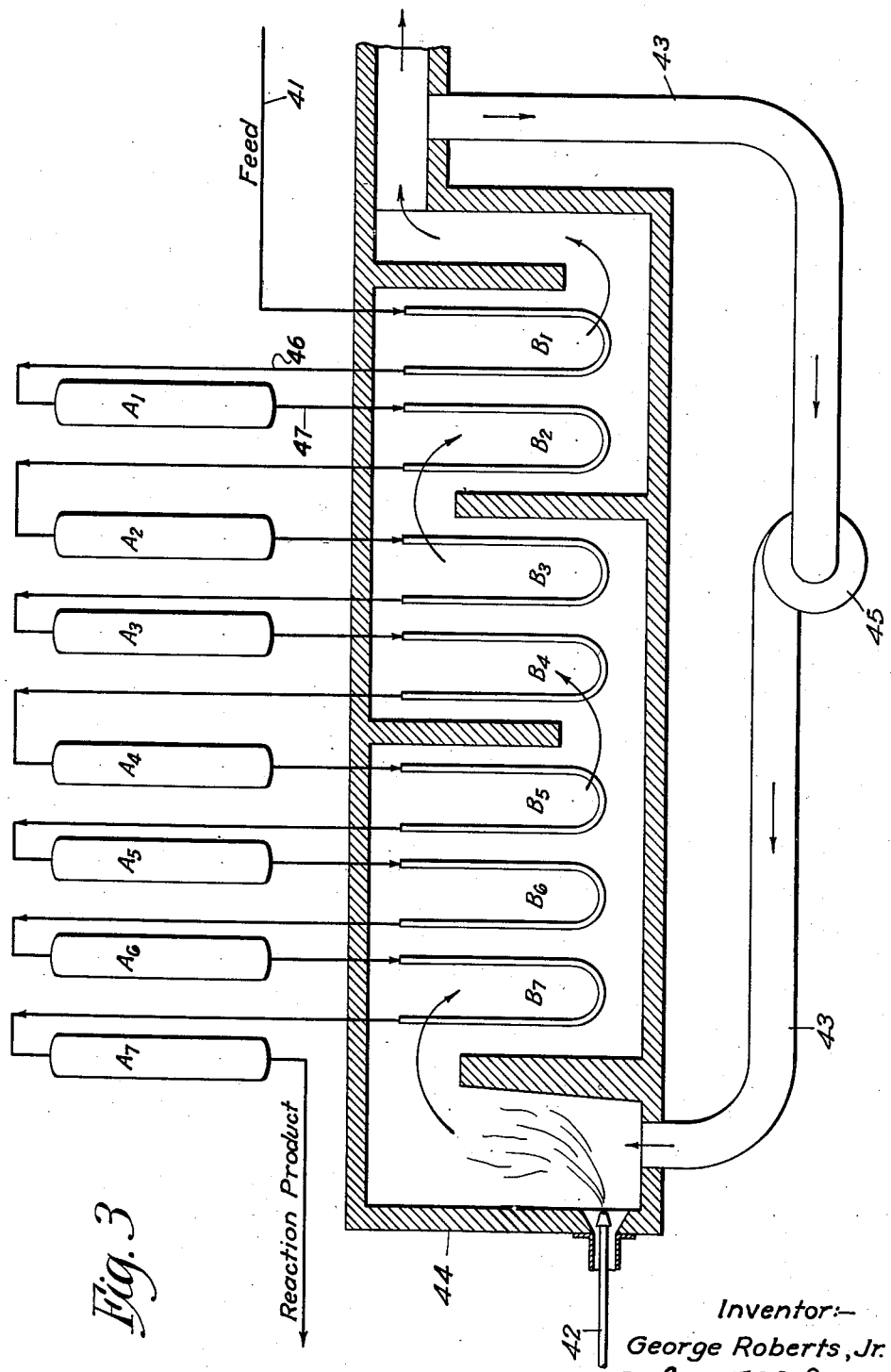

Patented Jan. 13, 1953

2,625,470

UNITED STATES PATENT OFFICE 2,625,470

METHOD FOR PRODUCING REDUCING GAS MIXTURES

George Roberts, Jr., Tulsa, Okla., assignor to Stanolind Oil and Gas Company, Tulsa, Okla., a corporation of Delaware Application August 8, 1946, Serial No. 689,151

2 Claims. (Cl. 48—196)

This invention relates to a method and means of making hydrogen and carbon monoxide mixtures and, more particularly, pertains to a method of preparing hydrogen and carbon monoxide mixtures from gaseous hydrocarbons by the reaction with carbon dioxide and water. More specifically, my invention relates to the catalytic reforming of methane to produce gaseous mixtures of hydrogen and carbon monoxide in a tubular reformer.

Mixtures of hydrogen and carbon monoxide are useful in preparing organic compounds and may be made from methane, steam, and carbon dioxide according to the following reactions:

$$3CH_4 + CO_2 + 2H_2O \rightarrow 4CO + 8H_2$$
$$CH_4 + CO_2 \rightarrow 2CO + 2H_2$$
$$CH_4 + H_2O \rightarrow CO + 3H_2$$

Any desirable ratio of hydrogen to carbon monoxide may be obtained by changing the proportions of fresh feed, hydrocarbon gas, steam, and the oxidation gas such as carbon dioxide. When it is desired to produce a synthesis gas mixture in which the ratio of hydrogen to carbon monoxide is high, increased amounts of water may be reacted; and when it is desired to make synthesis gas in which the ratio of hydrogen to carbon monoxide is less than 2:1, water is not introduced. Ordinarily, the hydrogen-carbon monoxide gas employed in the synthesis of hydrocarbons by the catalytic reduction of carbon monoxide in the presence of a synthesis catalyst such as of the cobalt or iron type will be in the ratio of between about 1:1 and about 3:1 by volume.

Suitable feed comprises methane which may be obtained from natural gas although other hydrocarbon gases from other sources such as those derived from coal, shale, or other carbonaceous materials or as by-products of petroleum refining operations can be employed.

Although the chemistry of the reforming operation is simple and straightforward, the engineering problems involved in this operation are of such a magnitude that no large scale operation such as is required for the synthetic fuel industry has yet been undertaken. Thus far only relatively small and inefficient installations such as those in use for the preparation of hydrogen for chemical use have attained commercial importance and in such installations a high cost of the final products have made the inherent inefficiences of minor importance.

The basic engineering problems arise from the fact that the reforming reactions proceed to substantial completion only at very high temperatures and that the reactions are highly endothermic. Thus it is necessary to supply large amounts of heat at high temperature levels. For example, in order to convert one mol of methane substantially completely to carbon monoxide and hydrogen by reaction with either carbon dioxide or water, it is necessary to supply in excess of 60,000 gram calories at a temperature level of 2000°–2200° F. in the absence of effective catalysts or at a level of 1400–1600° F. in the presence of effective catalysts.

In the synthetic fuel industry it will be desirable to carry out the reforming operation at maximum pressures even though the equilibrium is adversely affected by pressure to a moderate degree. This arises from the fact that reacting gases are available under a substantial pressure and that the product gases are used under pressure. A reforming process that can operate under increased pressure permits a reduction of the load on the compressors intermediate the reforming and synthesis stages. Thus far the maximum pressures which can be used in the reforming stage have been limited by the creeping stress of the tube walls at the point of highest tube wall temperature.

I have found that higher pressures can be used, greater flexibility is obtained and a surprisingly great economy of materials effected by the use of multi-stage operation in large scale reforming installations.

In conventional reformer operations, the fresh feed is divided and passed in parallel through single stage tubes containing catalyst wherein the gases are increased in temperature from approximately 600° F. to an outlet temperature of about 1500° F. The furnace is fired at the cold end of the tubes and heat is transferred from the fire box through the tube walls and thence to the reacting gases at a rate dependent upon the temperature of the flue gases, the temperature of the radiating surfaces of the furnace, the temperature of the reacting gases, and the overall coefficient of heat transfer. The tube wall has a temperature intermediate that of the combustion gases outside the tube and that of the reacting gases passing through the tube, the temperature of the tube wall being determined by the relative resistances to heat transfer outside or inside the tube. The heat transfer coefficient from tube to reacting gas increases as the gas reacts both as a result of increased linear velocity through expansion in the reaction and of increased temperature. Thus, in the conventional reformer process employing single pass tubes in parallel wherein an inlet temperature of 600° F. and an outlet temperature of 1500° F. at an inlet pressure of about 40 p. s. i. and an outlet pressure of about 30 p. s. i. are used, wall temperature ordinarily varies from approximately 1400° F. at the inlet through a maximum of 1800° F. midway down the tube to about 1600° F. at the outlet. Therefore, the average temperature might be about 1600° F. with a maximum of about 1800° F. Thus the pressure of operation is limited to about 40 to 50 p. s. i. by the creep stress of the metal at the maximum temperature.

One object of my invention is to provide a method and means for narrowing the differential between the maxima and minima tube wall temperatures so that the average temperature approaches the maximum allowable for the materials of construction. Another object is to provide a method and means for reforming light hydrocarbon gases under optimum temperature conditions. A further object is to provide a system which permits reforming at relatively higher pressures. Still another object is to provide a system which reduces the differential between the inlet and the outlet pressures permitting a higher outlet presure. A further object is to provide a novel system for permitting the indirect transfer of more heat at a lower temperature level. An additional object is to provide a novel system employing spaced injection of reactants. Another object of my inventions is to provide a method and means adapted for the reforming of methane to produce hydrogen and carbon monoxide mixtures in a controlled ratio. A further object is to provide method and means for increasing heat transfer rates for a given maximum allowable temperature. Another object of my invention is to provide a system wherein space velocities well within the turbulent range are used throughout the furnace. An additional object is to provide method and means to compensate for the changes in space velocities resulting from both reaction and thermal expansion. These and other objects of my invention will become apparent to those skilled in the art as the description thereof proceeds with reference to the drawings wherein:

Figure 3 is a diagrammatic illustration of a multi-stage tubular reformer adapted to provide alternate stages of superheating in externally heated tubes of relatively small diameter and of adiabatic reforming in packed tubes of relatively large diameter.

The objects of this invention can be attained by effecting the reforming of the hydrocarbon gases in a plurality of stages in series, each stage being maintained at successively higher temperature levels. The stage of maximum temperature can be located in the radiant zone of a furnace and the prior stages of lower temperature being located, for example, in the convection section of the furnace where they are heated by the hot combustion gas from the radiant zone.

Having provided a multi-stage, multi-temperature, multi-pressure reforming system which is the essence of my invention, several embodiments which enhance the value of my invention can be practiced. Thus spaced injection of superheated carbon dioxide and steam can be used to obtain the direct transfer of heat at a lower temperature level. This is feasible in as much as the endothermic conversion of methane proceeds more readily with carbon dioxide at the lower temperature level. Superheated steam can be used in excess of the stoichiometric requirement, thus lowering the quantity of heat to be transferred at the highest temperature level. This addition of superheated steam can be in an intermediate reforming stage. Optionally, a relatively small proportion of free oxygen, preferably diluted with superheated steam can be introduced into the final and maximum temperature stage.

Figure 1:
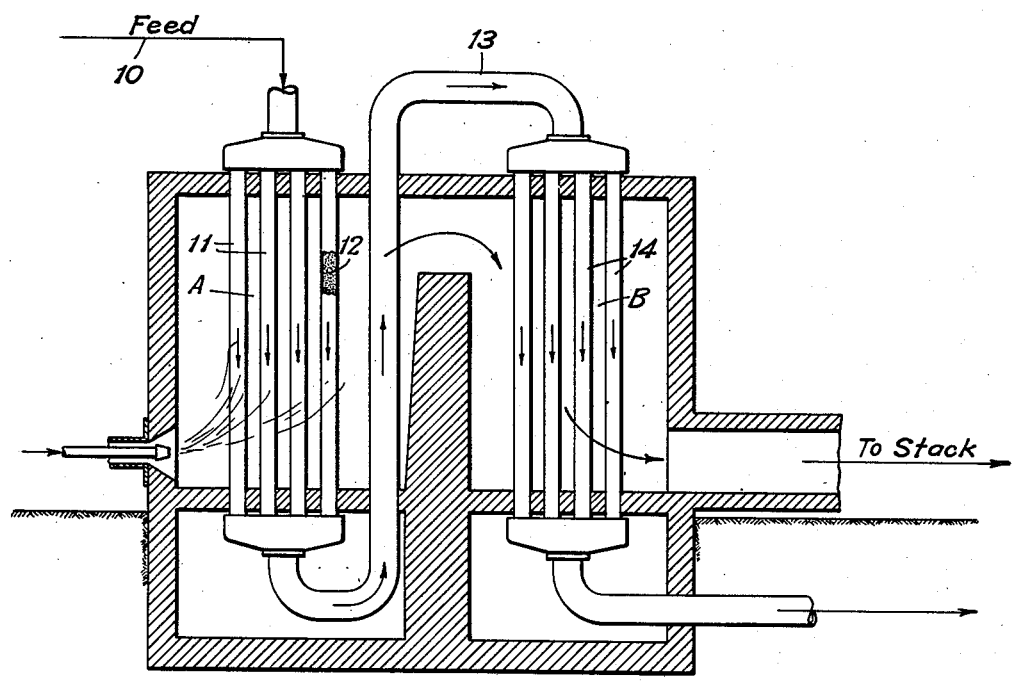
Figure 1 is a diagrammatic showing of a reformer employing simple multi-stage packed catalyst tubes.

Referring to Figure 1, fresh feed comprising hydrocarbon gas, carbon dioxide, and steam in suitable proportions to produce hydrogen and carbon monoxide mixtures of the desired ratio can be supplied to the system by line 10. The hydrocarbon gas can be desulfurized if necessary and then mixed with such proportions of carbon dioxide, steam, and /or oxygen as to give a gas mixture having an atomic hydrogen:carbon:oxygen ratio of about 4:1:1 for cobalt catalyst, and between about 4:1:1 and about 2:1:1 for iron catalyst. The feed gas mixture is introduced into the first stage, diagrammatically illustrated at A, which can comprise a plurality of tubes 11 packed with catalyst 12.

Any suitable catalyst may be employed for the conversion of hydrocarbons into mixtures of hydrogen and carbon monoxide; however, the catalyst is preferably a group VIII metal or metal oxide which may be supported on a carrier such as clay, Super Filtrol, silica gel, kieselguhr, alumina, or the like. Nickel on alumina is particularly useful. For example, a suitable catalyst may be prepared by saturating a carrier such as a difficultly reducible oxide with nickel nitrate, drying the mixture, roasting it to decompose the nickel nitrate into nickel oxide, and reducing it in such a way that nickel oxide is converted into metallic nickel.

A considerable amount of heat must be supplied for the gas reforming operation and this heat is preferably supplied by burning a part of the hydrocarbon feed with a recycled gas fraction. If desired, the flue gas can be scrubbed with a suitable solvent for absorbing carbon dioxide therefrom and the undissolved nitrogen expelled from the system. This recovered carbon dioxide can be supplied to the reforming operation as described herein.

Aliquot portions of the total feed pass downwardly in parallel through the substantially vertical tubes 11 which can be packed with the reforming catalyst. The feed gases can be preheated by indirect heat exchange with flue gases, but in any event enter the primary reforming stage A at a temperature of about 600° F. and leave this primary stage at a temperature of about 1200° F. The temperature rise of the gas in the initial stage normally will be between about 400° F. and about 600° F. depending upon the number of subsequent stages to be employed. Where two stages are used, the temperature rise of the gas ordinarily can be less than about 600° F. in the first stage, and less than about 400° F. in the second stage.

The space velocity through the gas reforming catalyst should be about 300 to 400 volumes of hydrocarbon gas, preferably about 350 volumes of hydrocarbon gas at standard conditions per volume of catalyst space per hour. In any event, the space velocities should be well within the turbulent range throughout the furnace.

The hot gases from the first stage A are transferred to the next succeeding stage by line 13, aliquot portions of the gases passing downwardly in parallel through the packed tubes 14 within the stage B. The tubes in the second stage may be of alloy steel. A tube-wall temperature of substantially the same magnitude as in the first stage can be used, the temperature variation over the length of the tube being less than 200° F. The temperature rise of the gases in the final stage is less than about 400° F. In a two-stage system, wherein a gas temperature rise of about 600° F. is taken in the initial stage, the temperature rise may be of the order of about 300° F. resulting in an outlet temperature of above about 1500° F.

In the prior art furnace, the average temperature rise of the gas in a single stage system is of the order of at least 900° F. and the tube wall temperature over its length varies about 400° F. In the multistage system in accordance with this invention, an average tube wall temperature of about 1800° F. is maintained over substantially the entire length of the tube, the linear temperature variation within a given stage being less than about 200° F.

The reaction or conversion temperature within the plurality of stages ordinarily will range between about 1000 and 2000° F. with a temperature rise in the gas of less than about 600° F. in the first stage and proportionately smaller temperature rises in succeeding stages. The temperature rise within the final stage should be less than about 100° F., and where two stages are employed, the temperature rise in the second stage ordinarily will be substantially less than in the first stage. Substantially atmospheric or superatmospheric pressure can be employed. In one embodiment employing alloy tubes in each of two stages, the gas temperature in the first stage may be increased from about 600° F. to about 1200° F. with a substantially uniform tube-wall temperature of about 1800° F. The average space velocity under these conditions in the first stage may be about 800 $v_g/v_c/hr$. The gas outlet temperature in the second stage may be between about 1500 and 1800° F. or higher, but normally the temperature rise of the gas in the final stage will be less than about 400° F. An average space velocity of about 1200 $v_g/v_c/$ hr. can be used in the second stage. It should be understood, however, that the tube wall temperature in each stage may be as high as the materials of construction will permit and the outlet temperature from the final stage may be as high as about 2200° F., particularly with less active catalyst. By employing a high tube wall temperature and the indicated space velocity in successive stages, fewer tubes will be required.

By this method, it is possible to hold the tube wall temperature in each stage very close to the maximum allowable temperature. As a result, the tubes in each stage are used at nearly their maximum efficiency. When alloy tubes are used throughout, fewer tubes will be required since the heat density throughout each stage is then approximately that obtained in the conventional reformer over only a relatively small portion of the single stage tube length. This saving in tubes is appreciable, and a saving of the order of twenty-five percent in tubes required may be obtained by this means.

The stages A and B may be within a single radiant section although greater ease of control may be accomplished by having separate radiant sections. The use of a radiant section for each stage is favored because of the greatly different heat densities in each stage.

Figure 2:
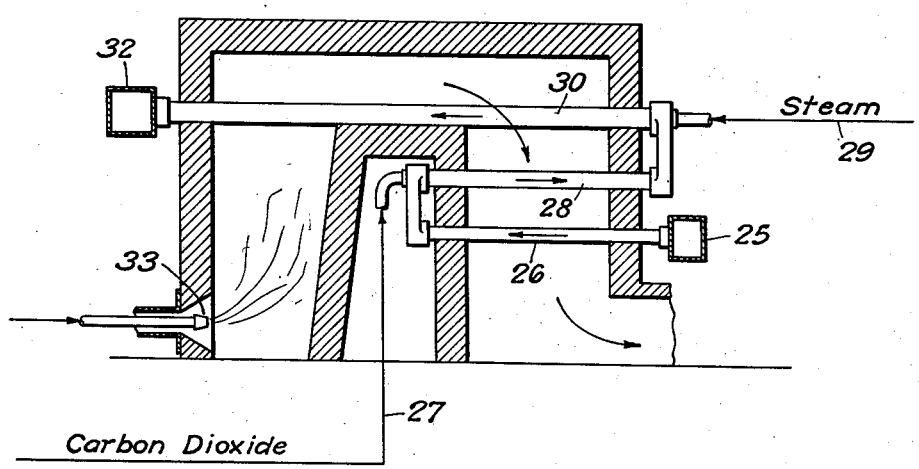
Figure 2 is a diagrammatic representation of a tubular furnace adapted to provide reforming stages at successively higher temperature levels with spaced injection features, and progressively increasing tube diameters.

Referring to the embodiment of my invention illustrated in Figure 2, hydrocarbon gas is supplied via header 25 to tube 26. If desired, some carbon dioxide and water can be admixed with the hydrocarbon gases being introduced at 25. Carbon dioxide is supplied by line 27 and admixed with the hydrocarbons before passing through reformer tube 28. Superheated steam in excess of the stoichiometric quantity is supplied by line 29 into reformer tube 30. The reformed mixture of hydrogen and carbon monoxide, together with excess steam, is withdrawn from the reformer by means of header 32. A gas burner 33 supplies radiant and convective heat to the reformer tubes 26, 28 and 30. The space velocity in the reformer tubes is maintained well within the turbulent range and tube volume can be adjusted to compensate for reaction and thermal expansion. The spaced injection of carbon dioxide and water effects reforming or endothermic conversion of the hydrocarbon gas at the temperature level which permits the indirect transfer of more heat. The introduction of superheated steam in the final stage of the reforming lowers the quantity of heat to be transferred at the highest temperature level. If desired, steam can be recovered from the reformed gas mixture before the gases are supplied to the hydrocarbon synthesis reaction.

Referring to Figure 3, fresh feed comprising hydrocarbon gas, carbon dioxide and steam in suitable proportions to produce a gas suitable for hydrocarbon synthesis enters by line 41, said feed gas having been preheated by heat exchange with the product gas or flue gas. The feed gas enters the first of a series of superheaters $B_1$ located within the convection zone of a furnace 44 heated by burning combustible gases entering by line 42. The superheaters are constructed of special alloys and are less than three inches and preferably about two inches in internal diameter. In each superheater several tubes may be operated in parallel although only one is shown in the drawing. The superheated gases leave the first stage superheater by line 46 and enter the first of a series of tubular catalyst chambers $A_1$. The gases react herein consuming at least a fraction of the superheat acquired in the superheater $B_1$. The cross-sectional area of the catalyst chamber is at least five and preferably ten times that of the first stage superheater tubes. Thus, the pressure drop through the catalyst bed is kept at a minimum. The partially converted gases from $A_1$ pass by line 47 to superheater $B_2$ and are heated to a temperature of 25 to 75° F., preferably about 50° F., higher than the exit gas from $B_1$. The gas from $B_2$ passes into catalyst chamber $A_2$ which operates at an average temperature somewhat higher than $A_1$. The gas then passes alternately through the superheaters $B_3$, $B_4$, $B_5$, $B_6$, $B_7$, etc., and catalyst chambers $A_3$, $A_4$, $A_5$, $A_6$, $A_7$, etc. all arranged in series. Each succeeding superheater and catalyst chamber operates at a higher average temperature than the superheater and catalyst chamber immediately prior.

I prefer to use from 10 to 15 stages and to control the temperature within the furnace by recycling a substantial portion of the flue gas by line 43 and blower 44.

I have found that the method of operation described above permits the operation at higher pressure and with less pressure drop than the older method of operating wherein the catalyst tubes of uniform diameter were located within the furnace. The increased operating pressure results from the fact that smaller diameter unpacked tubes offering little resistance to flow are subjected to high tube wall temperature rather than the large tubes containing catalyst.

From the above it will be apparent that I have provided a process for the manufacture of synthesis gas by effecting the reforming in at least two stages in series. The temperature rise of the gas in the first stage is less than about 600° F., and the gas temperature rise in the final stage is less than about 400° F. The tube wall temperature variation in a given stage is less than about 200° F. Thus, for example, the first stage operates with an outlet gas temperature of between about 1000 and 1200° F. The tube wall temperature in this first stage may be about 600° F. higher which provides a substantial temperature differential between the tube wall and the reacting gases resulting in higher heat input. The space velocity in the plurality of stages should be well within the turbulent range and sufficient to give a contact time of between about 2 and 60 seconds. Ordinarily, the outlet gas temperature in the second stage will be about 1500° F., the temperature rise of the gas in the second stage being less than about 400° F. Thus, the heat input in the final stage is substantially less than in the initial stage since most of the endothermic heat of reaction is supplied at the lower gas temperature level. By this means a system of substantially greater efficiency is provided for the reforming of methane to produce synthesis gas mixtures of any desired ratio of hydrogen to carbon monoxide between about 3 and about 1:1.

It is to be understood that, although my invention has been described in more or less detail, it is contemplated that various modifications may be made by those skilled in the art without departing from the scope and spirit of my invention. Therefore, my invention is not necessarily limited thereby but is defined by the appended claims.

What I claim is:

1. A method of producing a synthesis gas mixture of hydrogen and carbon monoxide which comprises the steps of supplying hydrocarbon feed gas and carbon dioxide to a first stage of a reforming zone, initially reforming a portion of hydrocarbon feed gas within a first reforming stage, supplying heat to said first reforming stage by convection while maintaining a space velocity in the first reforming stage well within the turbulent range, and thereby effecting the endothermic conversion of hydrocarbons with carbon dioxide, introducing the total reforming products into a higher temperature intermediate reforming stage, supplying a separate stream of carbon dioxide to said intermediate stage, and introducing the total reforming products from the intermediate reforming stage including the unreacted hydrocarbon feed gas unreacted in the first stage into a final highest temperature reforming stage wherein heat is supplied by radiation, whereby a mixture predominating in hydrogen and carbon monoxide is produced.

2. The method of claim 1 wherein steam is introduced into the final reforming stage together with the total reforming products from the intermediate reforming stage.

GEORGE ROBERTS, Jr.

REFERENCES CITED

The following references are of record in the file of this patent:

UNITED STATES PATENTS

| Number | Name | Date |
|---|---|---|
| 321,125 | McCarty | June 20, 1885 |
| 330,142 | McCarty | Nov. 10, 1885 |
| 1,224,787 | Ramage | May 1, 1917 |
| 1,677,363 | Olivier | July 17, 1928 |
| 1,736,065 | Williams | Nov. 19, 1929 |
| 1,894,140 | Wietzel et al. | Jan. 10, 1933 |
| 1,904,592 | Young et al. | Apr. 18, 1933 |
| 1,929,665 | Wilcox | Oct. 10, 1933 |
| 1,951,774 | Russell | Mar. 20, 1934 |
| 2,014,564 | Harnsberger | Sept. 17, 1935 |
| 2,028,326 | Hanks et al. | Jan. 21, 1936 |
| 2,029,657 | Frey et al. | Feb. 4, 1936 |
| 2,537,708 | Scharmann | Jan. 9, 1951 |